United States Patent [19]
Yamashita et al.

[11] Patent Number: 5,296,928
[45] Date of Patent: Mar. 22, 1994

[54] COMPOSITE SYNCHRONIZING SIGNAL SEPARATION CIRCUIT

[75] Inventors: Shinji Yamashita; Yoshihiro Inada, both of Hyogo, Japan

[73] Assignee: Mitsubishi Denki Kabushiki Kaisha, Tokyo, Japan

[21] Appl. No.: 25,469

[22] Filed: Mar. 3, 1993

[30] Foreign Application Priority Data

Mar. 12, 1992 [JP] Japan ............................... 4-053600

[51] Int. Cl.⁵ ..................... H04N 5/08; H04N 5/04
[52] U.S. Cl. .................... 348/529; 348/531; 348/500
[58] Field of Search ............. 358/153, 154, 155, 156, 358/157, 158, 159, 148, 149; H04N 5/08, 5/10, 5/04

[56] References Cited

U.S. PATENT DOCUMENTS

| | | | |
|---|---|---|---|
| 4,491,870 | 1/1985 | Aschwanden | 358/153 |
| 4,683,495 | 7/1987 | Brock | 358/153 |
| 4,954,893 | 9/1990 | Urakami | 358/154 |
| 4,999,708 | 3/1991 | Aoki et al. | 358/153 |
| 5,132,794 | 7/1992 | Okada et al. | 358/153 |
| 5,189,515 | 2/1993 | Chen | 358/153 |

OTHER PUBLICATIONS

"Basic Image Signal Processing", CQ Publishing Co., Apr. 1, 1987.

*Primary Examiner*—James J. Groody
*Assistant Examiner*—Michael H. Lee
*Attorney, Agent, or Firm*—Lowe, Price, LeBlanc & Becker

[57] ABSTRACT

A composite synchronizing signal separation circuit in which separation of the composite synchronizing signal by a digital circuit is realized and such trouble as adjusting the time constant is not needed and a phase shift is reduced: a horizontal interruption receiving circuit 1 which is reset by a timing pulse signal at the time point of ¾ from the starting time point of one horizontal synchronizing period, and separates and outputs a horizontal synchronizing signal HD from a composite synchronizing signal SYNC; a schedule counter circuit 2 which is reset by the horizontal synchronizing signal HD and outputs count value while counting up to a predetermined value in one horizontal synchronizing period; a timing decoding circuit 3 which decodes the count value and respectively outputs timing pulse signals at the time points of ¼, ½ and ¾ from the starting time point of one horizontal synchronizing period; and a vertical interruption receiving circuit 4 which samples the composite synchronizing signal SYNC by these signals and outputs a vertical synchronizing signal VD.

4 Claims, 11 Drawing Sheets

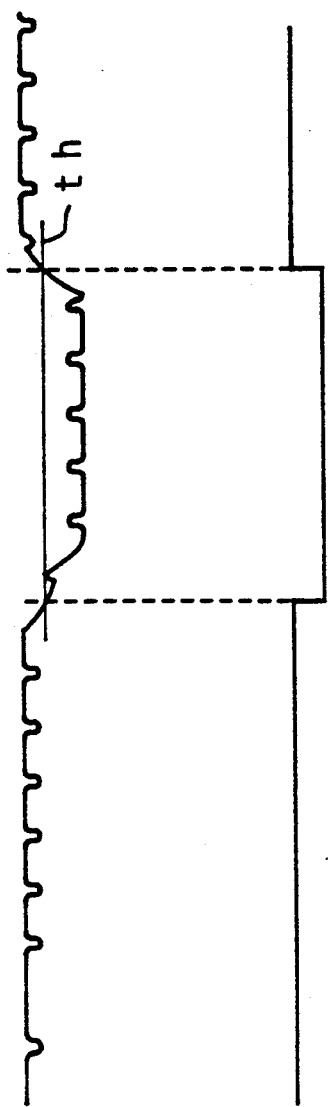
Fig. 2(a) Prior Art COMPOSITE SYNCHRONIZING SIGNAL
Fig. 2(b) Prior Art SIGNAL SA
Fig. 2(c) Prior Art VERTICAL SYNCHRONIZING SIGNAL

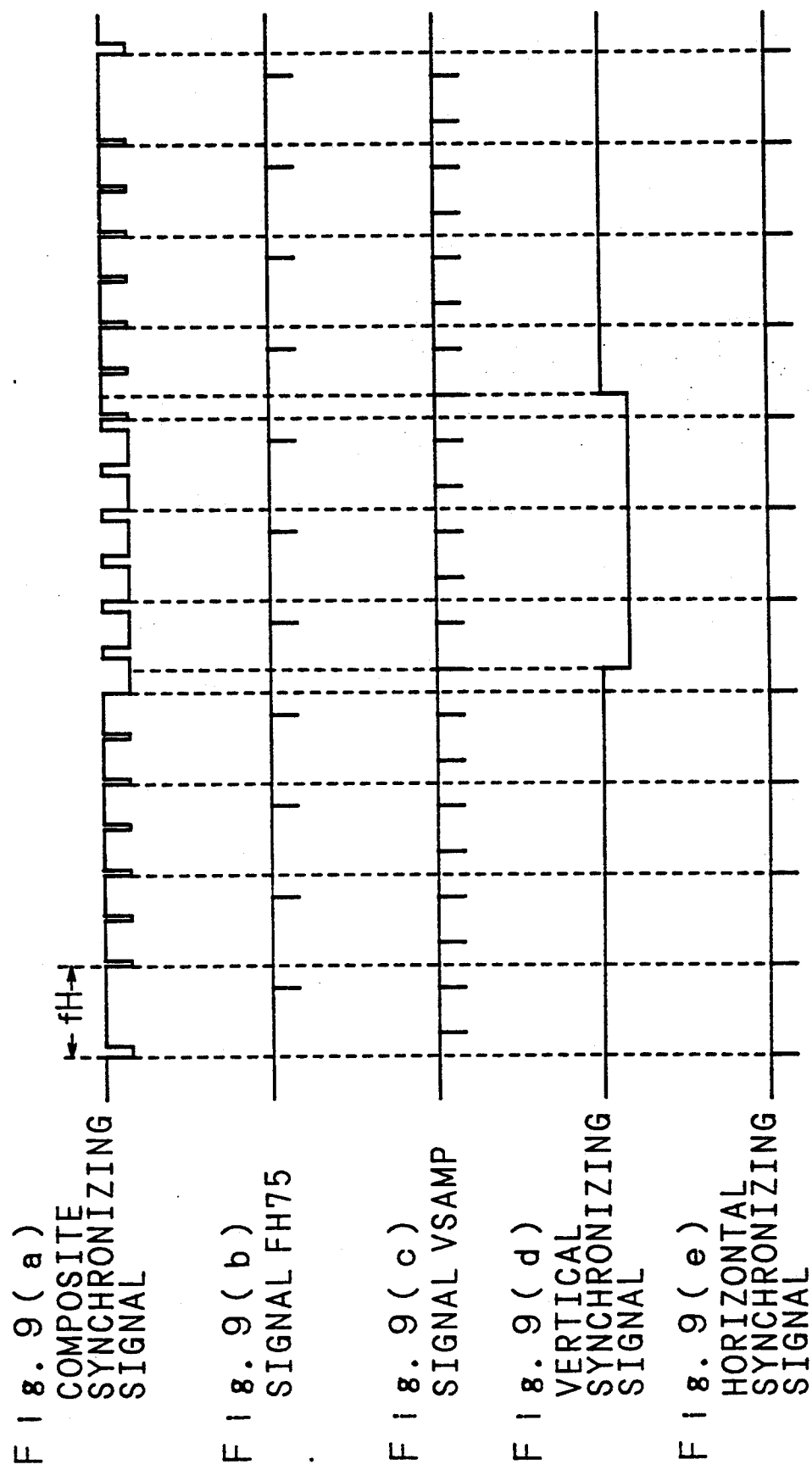

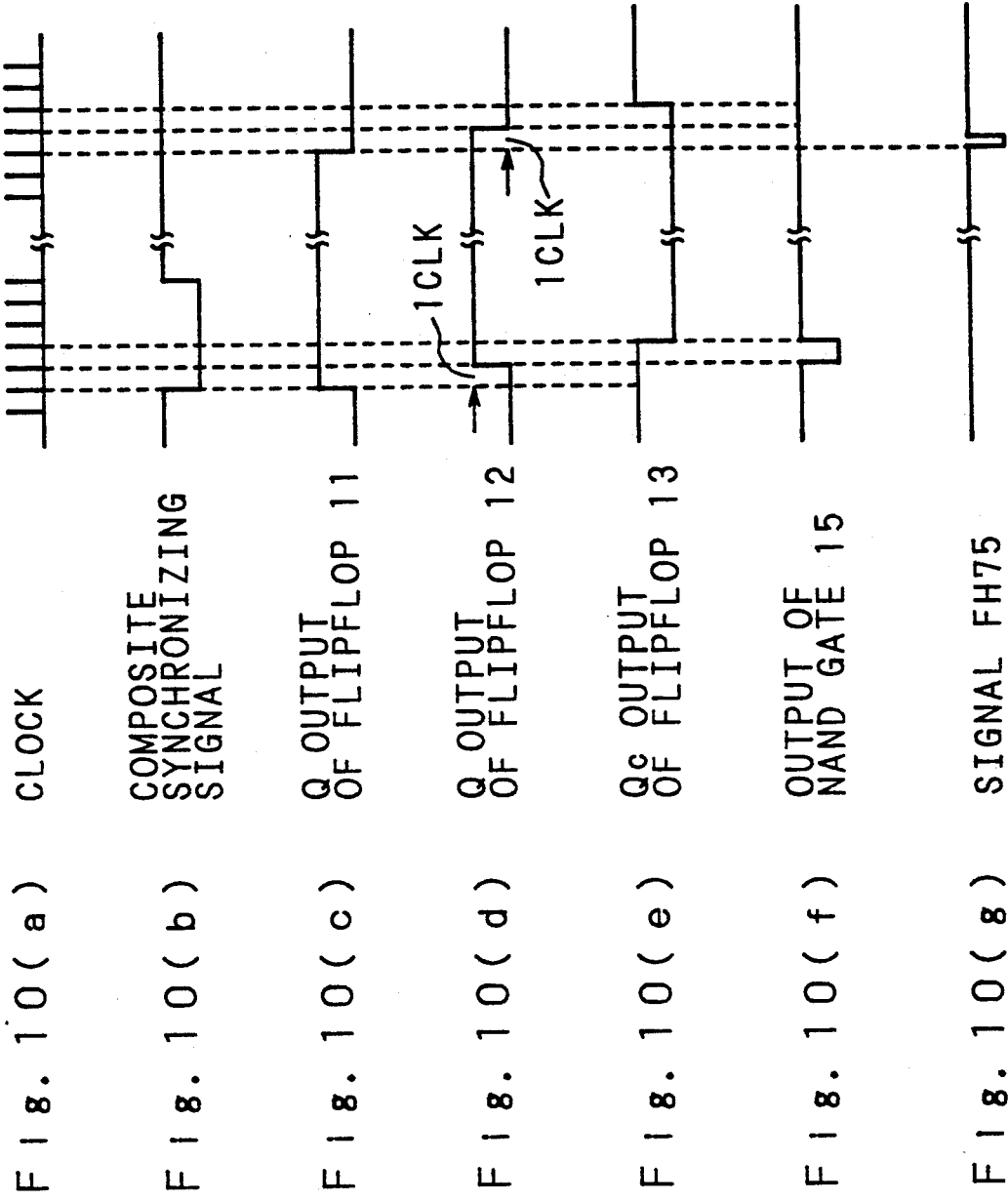

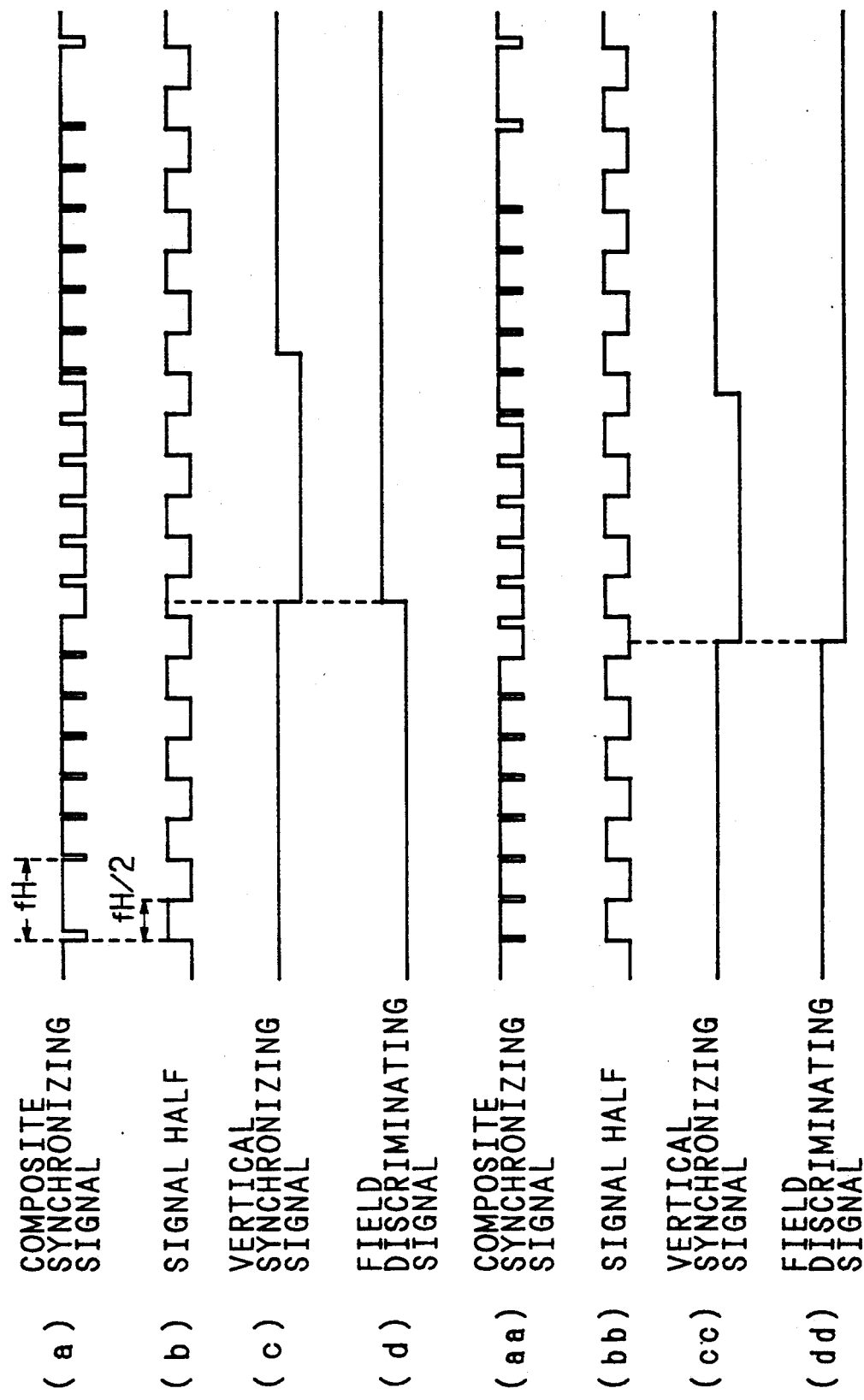

COMPOSITE SYNCHRONIZING SIGNAL SEPARATION CIRCUIT

BACKGROUND OF THE INVENTION

1. Field of the Invention

The present invention relates to a composite synchronizing signal separation circuit, and more particularly, to a composite synchronizing signal separation circuit of a digital circuit system, which separates a horizontal synchronizing signal and a vertical synchronizing signal from an inputted composite synchronizing signal, and further, generates a field discriminating signal.

2. Description of the Related Art

FIG. 1 is a circuit diagram showing a configuration of a composite synchronizing signal separation circuit according to an analog circuit system disclosed, for example, in "Basic Image Signal Processing", issued on Apr. 1, 1987 by CQ Publishing Co. as an example of the prior art.

In FIG. 1, reference symbols 6a, 6b, 6c respectively designate resistors, 7 designates a capacitor and 8 designates a comparator.

A composite synchronizing signal SYNC is inputted to a minus-side input terminal of the comparator 8 via the resistor 6a. Between the resistor 6a and the minus-side input terminal of the comparator 8, the other end of the capacitor 7 whose one end is connected to an earth potential is connected. The capacitor 7 and the resistor 6a constitute an integration circuit. The resistors 6b and 6c are connected in series, whose one end is connected to a power potential and the other end is connected to the earth potential to constitute a potential dividing circuit. Potential generated at a connecting point of the resistors 6b and 6c is given to a plus-side input terminal of the comparator 8 as a threshold value.

The operation of such conventional composite synchronizing signal separation circuit by an analog circuit is described with reference to a timing chart of FIG. 2 showing the operating state.

The composite synchronizing signal SYNC which is to be inputted is, as shown in FIG. 2 (a), composed of a relatively minor cycle negative-polarity horizontal synchronizing signal and a relatively major cycle negative-polarity vertical synchronizing signal, and during the period of vertical synchronizing signal, the horizontal synchronizing signal is in a positive polarity. Though one horizontal synchronizing period is indicated by fH, before and after the vertical blanking time including the negative-polarity vertical synchronizing signal, the horizontal synchronizing signal is $\frac{1}{2}$ of the original one horizontal synchronizing period fH.

When such composite synchronizing signal SYNC is inputted to the integration circuit constituted by the resistor 6a and the capacitor 7, a saw tooth integration wave-form signal SA as shown in FIG. 2 (b) is outputted. The integration wave-form signal SA is inputted to the minus-side input terminal of the comparator 8, and when it is above a threshold potential inputted to the plus-side input terminal of the comparator 8, the signal shaped into a high level is outputted and when it is below, the signal shaped into a low level is outputted from the comparator 8 as shown in FIG. 2 (c). The output signal from the comparator 8 is the vertical synchronizing signal VD.

In the conventional composite synchronizing signal separation circuit as mentioned above, since the vertical synchronizing signal is separated by the analog integration circuit, the time constant of the integration circuit constituted by the resistor and the capacitor must be adjusted, and there was a possibility that a phase shift may be occurs between the horizontal synchronizing signal and the vertical synchronizing signal, by the level of the composite synchronizing signal SYNC which is to be inputted and ambient temperature or the like of the apparatus.

SUMMARY OF THE INVENTION

The present invention has been devised in view of such circumstances, therefore, it is an object thereof to provide a composite synchronizing signal separation circuit, in which such trouble as adjusting the time constant is saved and the phase shift is reduced as compared with the prior art, by realizing separation of a composite synchronizing signal with a digital circuit in place of a conventional analog circuit.

The composite synchronizing signal separation circuit of the present invention is directed to a composite synchronizing signal separation circuit, which separates, from the composite synchronizing signal composed of a horizontal synchronizing signal and a vertical synchronizing signal, two synchronizing signals respectively, and comprises: a horizontal interruption receiving circuit as a horizontal synchronizing signal separation circuit which separates and outputs the horizontal synchronizing signal from the composite synchronizing signal in the case of reset state; a schedule counter circuit as a counter circuit which is reset by the horizontal synchronizing signal outputted by the horizontal interruption receiving circuit, and outputs count value while counting up to a predetermined value during one horizontal synchronizing period; a timing decoding circuit as a decoding circuit which decodes the count value outputted by the schedule counter circuit, and outputs a vertical synchronizing sampling pulse signal, a half H signal and a interruption mask release timing pulse signal which are respectively the timing signals at time points of $\frac{1}{4}$, $\frac{1}{2}$ and $\frac{3}{4}$ from the starting time point of one horizontal synchronizing period; and a vertical synchronizing signal separation circuit as a vertical synchronizing signal separation circuit which outputs the vertical synchronizing signal by inverting its own output signal level respectively, when the composite synchronizing signal level differs from the last first and third output timings at the output timings of the timing signals; the horizontal synchronizing signal separation circuit further being constituted so as to be reset by the interruption mask release timing pulse signal.

The composite synchronizing signal separation circuit of the present invention also comprises, in addition to the above-mentioned configuration, a field discriminating circuit which outputs a field discriminating signal by inverting its own output signal level, when the half H signal level differs from the last output timing of the vertical synchronizing signal at the output timings of the vertical synchronizing signals from the vertical interruption receiving circuit.

In the composite synchronizing signal separation circuit of the present invention, the horizontal interruption receiving circuit is reset at every output timings of the interruption mask release timing pulse signal from the timing decoding circuit to separate and output the horizontal synchronizing signal from the composite synchronizing signal, the schedule counter circuit reset by the horizontal synchronizing signal output and outputs count value while counting up to the predetermined value during one horizontal synchronizing period, the timing decoding circuit decodes the count value outputted from the schedule counter circuit and outputs the vertical synchronizing sampling pulse signal, half H signal and interruption mask release timing pulse signal at the time points of ¼, ½ and ¾ from the starting time point of one horizontal synchronizing period, and the vertical interruption receiving circuit outputs the vertical synchronizing signal by inverting its own output signal level, when the composite synchronizing signal level differs from the last first and third output timings, at the output timing of the timing signals.

In the composite synchronizing signal separation circuit of the present invention, the field discriminating circuit outputs the field discriminating signal by inverting its own output signal level, when the half H signal level differs from the last output timing of the vertical synchronizing signal, at the output timings of the vertical synchronizing signals from the vertical interruption receiving circuit.

The above and further objects and features of the invention will more fully be apparent from the following detailed description with accompanying drawings.

BRIEF DESCRIPTION OF THE DRAWINGS

FIG. 11 (dd) is a wave form of field discriminating signal of timing chart for explaining the operation of a composite synchronizing signal separation circuit of the present invention.

DESCRIPTION OF THE PREFERRED EMBODIMENTS

In the following, the present invention is described in detail on the bases of the drawings showing the embodiments thereof.

Figure 1:
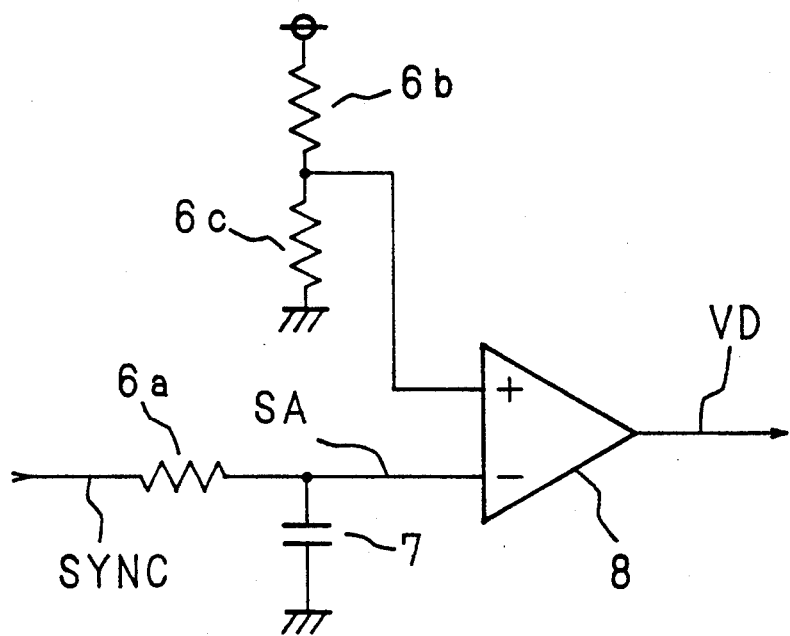
FIG. 1 is a circuit diagram showing a configuration of a composite synchronizing signal separation circuit by an analog circuit as an example of the prior art, FIG. 2 (a) is a wave form of composite synchronizing signal of timing chart showing the operating state of a conventional example, FIG. 2 (b) is a wave form of signal SA of timing chart showing the operating state of a conventional example, FIG. 2 (c) is a wave form of vertical synchronizing signal of timing chart showing the operating state of a conventional example.
Figure 3:
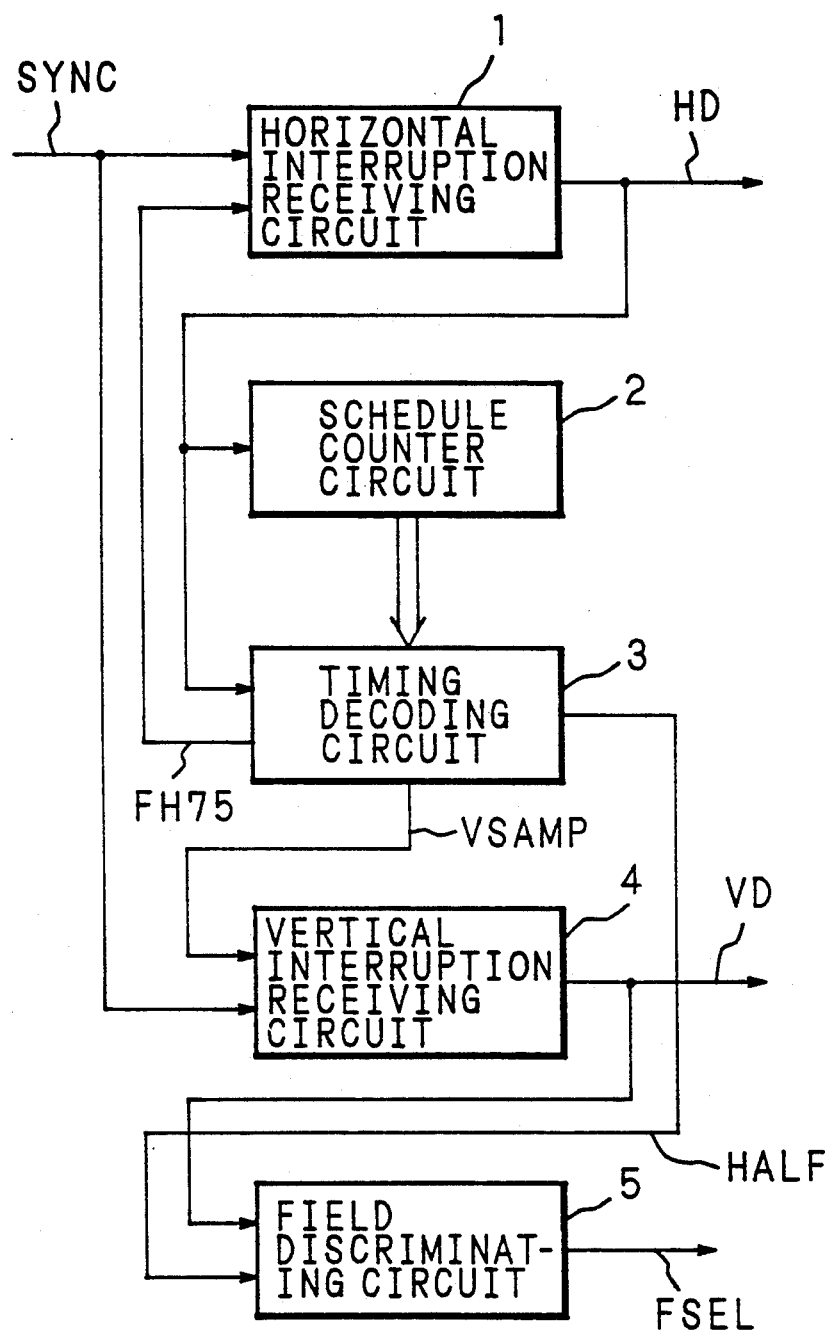
FIG. 3 is s block diagram showing a basic configuration of a composite synchronizing signal separation circuit according to the present invention.

FIG. 3 is a block diagram showing a basic configuration of a composite synchronizing signal separation circuit according to the present invention.

The composite synchronizing signal separation circuit of the present invention is, basically, constituted by a horizontal interruption receiving circuit 1, a schedule counter circuit 2, a timing decoding circuit 3, a vertical interruption receiving circuit 4 and a field discriminating circuit 5.

Figure 4:
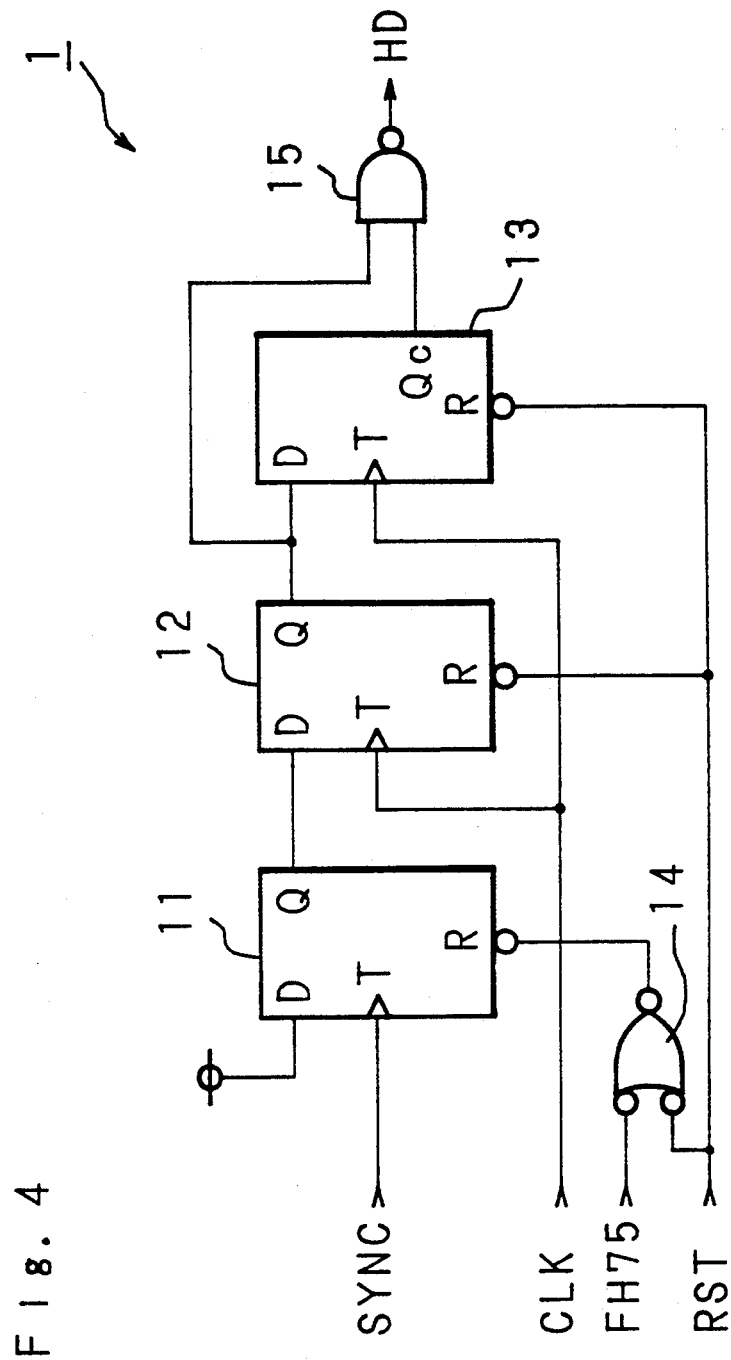
FIG. 4 is a circuit diagram showing a specific circuit configuration of a horizontal interruption receiving circuit of a composite synchronizing signal separation circuit of the present invention.

A specific circuit configuration of the horizontal interruption receiving circuit 1 is as shown in a circuit diagram of FIG. 4. The horizontal interruption receiving circuit 1 basically inputs a composite synchronizing signal SYNC and outputs a horizontal synchronizing signal HD. However, an interruption mask release timing pulse signal FH 75 which is an output signal of the timing decoding circuit 3, to be described later, is also inputted.

In the circuit diagram of FIG. 4, numerals 11, 12 and 13 designate D-flip-flops which are in 3-stage cascade connection. A power potential is inputted to an input terminal D of a first-stage D-flip-flop 11, and the composite synchronizing signal SYNC is inputted to an input terminal T. The output signal from an output terminal Q of the first stage D-flip-flop 11 is inputted to an input terminal D of a second-stage D-flip-flop 12, and a clock CLK is inputted to the input terminal T. Furthermore, the output signal from an output terminal Q of the second-stage D-flip-flop 12 is inputted to an input terminal D of a third-stage D-flip-flop 13, and the clock CLK is inputted to the input terminal T. The output signal from the output terminal Q of the second-stage D-flip-flop 12 is also inputted to one input terminal of a two-input NAND gate 15.

The output signal from an output terminal Qc on the reversed side of the third-stage D-flip-flop 13 is inputted to the other input terminal of the NAND gate 15. The output signal of the NAND gate 15 is the horizontal synchronizing signal HD.

The output signal (negative logic) of a two-input OR gate 14 is inputted to a reset terminal R of the D-flip-flop 11. Both of the two inputs of the OR gate 14 are negative logics, to one input thereof an interruption mask release timing pulse signal FH75 which is one output signal of the timing decoding circuit 3, to be described later, is inputted, and to the other input, a reset signal RST is inputted. The above-mentioned reset signal RST is inputted directly to the reset terminals R of the D-flip-flops 12 and 13.

The horizontal synchronizing signal HD which is the output signal of the aforementioned horizontal interruption receiving circuit 1 is inputted, as a load signal, to the schedule counter circuit 2, which counts the clock and outputs the count value to the timing decoding circuit 3.

Figure 5:
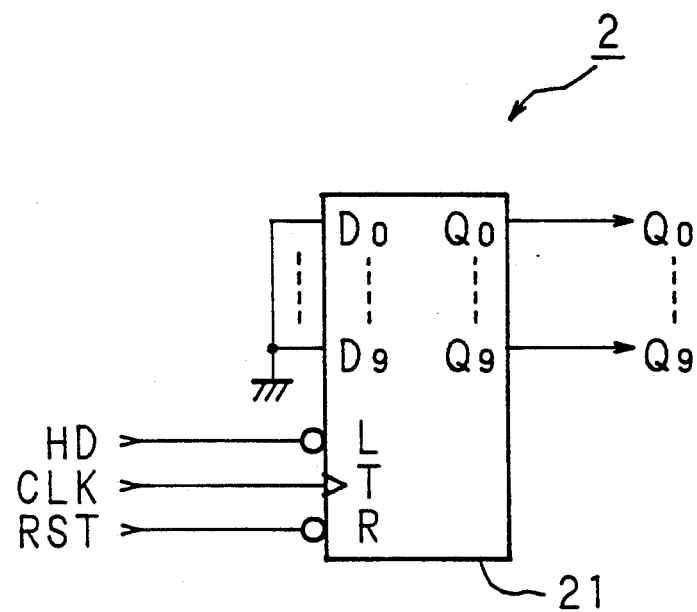
FIG. 5 is a circuit diagram showing a specific configuration of a schedule counter circuit of a composite synchronizing signal separation circuit of the present invention.

FIG. 5 is a circuit diagram showing a specific configuration of the schedule counter circuit 2 constituted by one counter circuit 21.

10-bit input terminals D1, D1, ... D9 of the counter circuit 21 constituting the schedule counter circuit 2 are all grounded to an earth potential, and the horizontal synchronizing signal HD which is the output signal of the aforementioned horizontal interruption receiving circuit 1 is inputted to a negative logic load terminal L, the clock CLK to an input terminal T and the reset signal RST to a reset terminal R. Meanwhile, though the outputs of the counter circuit 21 are outputted from 10-bit output terminals Q0, Q1, ... Q9, since all of the input terminals D0, D1, ... D9 are connected to the earth potential, when the horizontal synchronizing signal HD of negative polarity is inputted to the load terminal L, "0" is loaded, as an initial value, from the input terminal D0, D1, ... D9. Thus, when the horizontal synchronizing signal HD is inputted to the load terminal L, the counter circuit 21 starts to count the clock CLK inputted to the input terminal T from the initial value "0", and outputs the count value from the 10-bit output terminals Q0, Q1, ... Q9.

The count value output of the above-mentioned schedule counter circuit 2 is inputted to the timing decoding circuit 3, which decodes the count value and outputs three timing pulses, namely, the interruption mask release timing pulse signal FH75, vertical synchronizing sampling pulse signal VSAMP and half H signal HALF.

Figure 6:
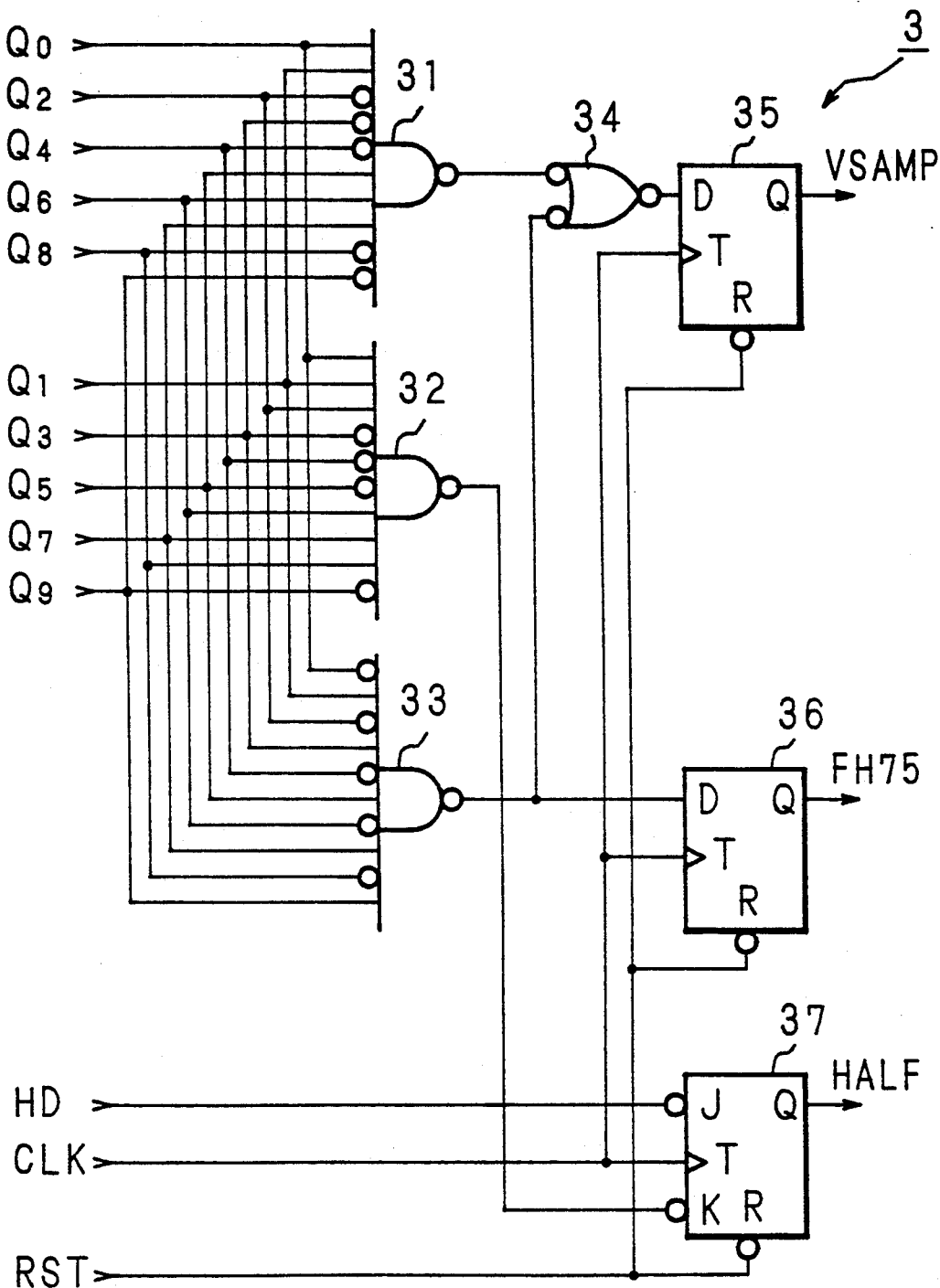
FIG. 6 is a circuit diagram showing a specific configuration of a timing decoding circuit of a composite synchronizing signal separation circuit of the present invention.

FIG. 6 is a circuit diagram showing a specific configuration of the timing decoding circuit 3.

The output signals from the 10-bit output terminals Q0, Q11 ... Q9 of the counter circuit 21 of the schedule counter circuit 2 are all inputted to NAND gates 31, 32 and 33. To the first NAND gate 31, the output signals from the output terminals Q0, Q1, Q5, Q6 and Q7 are inputted intact, and the output signals from the output terminals Q2, Q3, Q4, Q8 and Q9 are inputted inversely. To the second NAND gate 32, the output signals from the output terminals Q0, Q1, Q2, Q6, Q7 and Q8 of the counter circuit 21 are inputted intact, and the output signals from the output terminals Q3, Q4, Q5 and Q9 inputted inversely. To the third NAND gate 33, the output signals from the output terminals Q1, Q3, Q5, Q7 and Q9 of the counter circuit 21 are inputted intact, and the output signals from the output terminals Q0, Q2, Q4, Q6 and Q8 are inputted inversely.

The output signal of the first NAND gate 31 is inputted to one input terminal of an OR gate 34 whose two inputs are both negative logic, the output signal of the second NAND gate 32 is inputted to an input terminal K of a J-K flip-flop 37, and the output signal of the third NAND gate 33 is inputted to the other input terminal of the OR gate 34 and an input terminal D of a second D-flip-flop 36. The negative logic output signal of the OR gate 34 is inputted to an input terminal D of a first D-flip-flop 35.

As stated above, the negative logic output of the OR gate 34 is inputted to the input terminal D of the first D-flip-flop 35, the clock CLK is inputted to an input terminal T and the reset signal RST is inputted to a reset terminal R. As stated above, the output signal of the third NAND gate 33 is inputted to the input terminal D of the second D-flip-flop 36, the clock CLK to the input terminal T and the reset signal RST to the reset terminal R. Furthermore, the horizontal synchronizing signal HD which is the output signal of the horizontal interruption receiving circuit 1 is inputted to a negative logic input terminal J of the J-K flip-flop 37, the clock CLK to an input terminal T and the negative logic output of the second NAND gate 32 to a negative logic input terminal K as previously mentioned.

The output signal from an output terminal Q of the first D-flip-flop 35 is inputted to the vertical interruption receiving circuit 4 as the vertical synchronizing sampling pulse signal VSAMP, the output signal from the output terminal Q of the second D-flip-flop 36 is inputted to the horizontal interruption receiving circuit 1 as the interruption mask release timing pulse signal FH 75, and the output signal from the output terminal Q of the J-K flip-flop 37 is inputted to the field discriminating circuit 5 as the half H signal HALF.

The composite synchronizing signal SYNC and the vertical synchronizing sampling pulse signal VSAMP which is the output of the aforementioned timing decoding circuit 3 are inputted to the vertical interruption receiving circuit 4, from which the vertical synchronizing signal VD is outputted.

Figure 7:
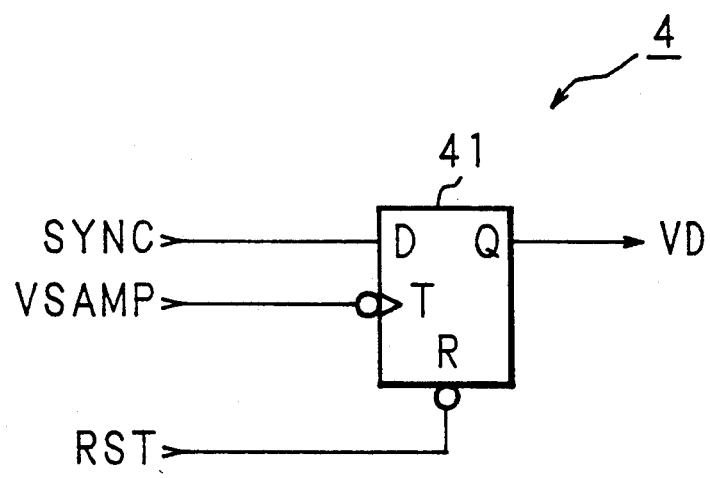
FIG. 7 is a circuit diagram showing a specific configuration of a vertical interruption receiving circuit of a composite synchronizing signal separation circuit of the present invention.

FIG. 7 is a circuit diagram showing a specific configuration of the vertical interruption receiving circuit 4.

The vertical interruption receiving circuit 4 is constituted by one D-flip-flop 41, and to an input terminal D of which the composite synchronizing signal SYNC is inputted, to an input terminal T the vertical synchronizing sampling pulse signal VSAMP which is the output signal of the timing decoding circuit 3 is inputted, and to a reset terminal R the reset signal RST is inputted, the output signal from an output terminal Q being the vertical synchronizing signal VD.

The vertical synchronizing signal VD which is the output signal of the aforementioned vertical interruption receiving circuit 4 and the half H signal HALF which is the output signal of the aforementioned timing decoding circuit 3 are inputted to the field discriminating circuit 5, from which a field discriminating signal FSEL is outputted.

Figure 8:
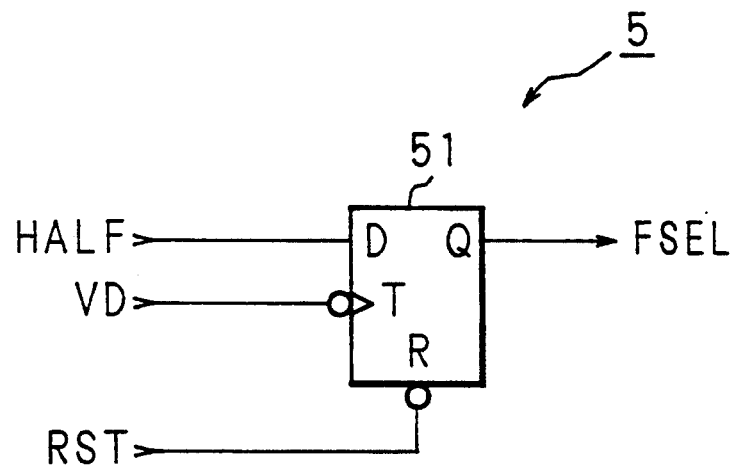
FIG. 8 is a circuit diagram showing a specific configuration of a field discriminating circuit of a composite synchronizing signal separation circuit of the present invention, FIG. 9 (a) is a wave form of composite synchronizing signal of timing chart for explaining the operation of a composite synchronizing signal separation circuit of the present invention, FIG. 9 (b) is a wave form of signal FH75 of timing chart for explaining the operation of a composite synchronizing signal separation circuit of the present invention, FIG. 9 (c) is a wave form of signal VSAMP of timing chart for explaining the operation of a composite synchronizing signal separation circuit of the present invention, FIG. 9 (d) is a wave form of vertical synchronizing signal of timing chart for explaining the operation of a composite synchronizing signal separation circuit of the present invention, FIG. 9 (e) is a wave form of horizontal synchronizing signal of timing chart for explaining the operation of a composite synchronizing signal separation circuit of the present invention, FIG. 10 (a) is a wave form of clock of timing chart showing the operating state of a horizontal interruption receiving circuit of the present invention, FIG. 10 (b) is a wave form of composite synchronizing signal of timing chart showing the operating state of a horizontal interruption receiving circuit of the present invention, FIG. 10 (c) is a wave form of Q output of flipflop 11 of timing chart showing the operating state of a horizontal interruption receiving circuit of the present invention, FIG. 10 (d) is a wave form of Q output of flipflop 12 of timing chart showing the operating state of a horizontal interruption receiving circuit of the present invention, FIG. 10 (e) is a wave form of Qc output of flipflop 13 of timing chart showing the operating state of a horizontal interruption receiving circuit of the present invention, FIG. 10 (f) is a wave form of output of NAND gate 15 of timing chart showing the operating state of a horizontal interruption receiving circuit of the present invention, FIG. 10 (g) is a wave form of signal FH75 of timing chart showing the operating state of a horizontal interruption receiving circuit of the present invention, FIG. 11 (a) is a wave form of composite synchronizing signal of timing chart for explaining the operation of a composite synchronizing signal separation circuit of the present invention, FIG. 11 (b) is a wave form of signal HALF of timing chart for explaining the operation of a composite synchronizing signal separation circuit of the present invention, FIG. 11 (c) is a wave form of vertical synchronizing signal of timing chart for explaining the operation of a composite synchronizing signal separation circuit of the present invention, FIG. 11 (d) is a wave form of field discriminating signal of timing chart for explaining the operation of a composite synchronizing signal separation circuit of the present invention, FIG. 11 (aa) is a wave form of composite synchronizing signal of timing chart for explaining the operation of a composite synchronizing signal separation circuit of the present invention, FIG. 11 (bb) is a wave form of signal HALF of timing chart for explaining the operation of a composite synchronizing signal separation circuit of the present invention, FIG. 11 (cc) is a wave form of vertical synchronizing signal of timing chart for explaining the operation of a composite synchronizing signal separation circuit of the present invention.

FIG. 8 is a circuit diagram showing a specific configuration of the field discriminating circuit 5.

The field discriminating circuit 5 is constituted by one D-flip-flop 51, and to an input terminal D of which the half H signal HALF which is the output signal of the aforementioned timing decoding circuit 3 is inputted, to an input terminal T the vertical synchronizing signal VD which is the output signal of the vertical interruption receiving circuit 4 is inputted, and to a reset terminal R the reset signal RST is inputted, the output signal from the output terminal Q being the field discriminating signal FSEL.

The operation of the composite synchronizing signal separation circuit of the present invention constituted as above, at first, separation of the horizontal synchronizing signal HD and the vertical synchronizing signal VD, is described with reference to the timing charts shown in FIG. 9, FIG. 10 and FIG. 11. The following descriptions are for the case where the composite synchronizing signal separation circuit of the present invention is applied in a television signal of the NTSC system which is common in Japan, U.S.A. and so on.

The composite synchronizing signal SYNC as shown in FIG. 9 (a) is inputted to the horizontal interruption receiving circuit 1, from which the horizontal synchronizing signal HD is outputted.

FIG. 10 is the timing chart showing the operating state of the horizontal interruption receiving circuit 1, whose specific circuit configuration is shown in FIG. 4.

First, assuming that the D-flip-flops 11, 12 and 13 of the horizontal interruption receiving circuit 1 are all reset, in this case, as shown at left-side ends of FIGS. 10 (c), (d), (e), the output signals from the output terminals Q of the first and second stage D-flip-flops 11 and 12 are at a low level, and the output signal from the output terminal Qc of the third-stage D-flip-flop 13 is at a high level. The horizontal synchronizing signal HD which is the output signal of the NAND gate 15 is at a high level as shown at left-side end of FIG. 10 (f).

When the composite synchronizing signal SYNC falls from such state as shown in FIG. 10 (b), in synchronism with the falling edge, the output signal from the output terminal Q of the first-stage D-flip-flop 11 becomes high level as shown in FIG. 10 (c). This high-level signal is taken into the second-stage D-flip-flop 12 in synchronism with the next pulse of the clock CLK shown in FIG. 10 (a), and the output signal from its output terminal Q becomes high level as shown in FIG. 10 (d).

Since the output signal from the output terminal Qc of the third-stage D-flip-flop 13 is still kept at high level as shown in FIG. 10 (e) at the time point where the output signal from the output terminal Q of the second-stage D-flip-flop 12 has changed to the high level, the high-level signal is inputted to the two input terminals of the NAND gate 15, and the vertical synchronizing signal VD which is its output signal changes to the low level as shown in FIG. 10 (f). Then, in synchronism with the next pulse of clock CLK, the high-level output signal from the output terminal Q of the second-stage D-flip-flop 12 is taken into the third-stage D-flip-flop 13, and the output signal from its output terminal Qc chances to the low level as shown in FIG. 10 (e). By the output signal from the output terminal Qc of the third-stage D-flip-flop 13, which changes to the low level, the output signal of the NAND gate 15 changes to the high level as shown in FIG. 10 (f). In the manner mentioned above, the vertical synchronizing signal VD which is the output signal of the NAND gate 15 becomes low level only during one period of the clock CLK.

As shown in FIG. 9 (a), before and after the vertical blanking time including the negative-polarity vertical synchronizing signal, besides the horizontal synchronizing signal HD which appears in the original one horizontal synchronizing, period fH, the horizontal synchronizing signal also appears at the position of 50%. And hence, during the vertical flyback time, the horizontal interruption receiving circuit 1 must not separate the signal appearing at the position of 50% of one horizontal synchronizing period fH. As shown in the timing charts of FIG. 10, the NAND gate 15 of the horizontal interruption receiving circuit 1 keeps the high-level output after outputting the low level horizontal synchronizing signal HD once. In order to release such state, as to be described later, the interruption mask release timing pulse signal FH 75, which is generated at the position of 75% of one horizontal synchronizing period, is given to the horizontal interruption receiving circuit I by the timing decoding circuit 3.

As mentioned above, in the state where the NAND gate 15 of the horizontal interruption receiving circuit 1 keeps the high-level output after outputting the low-level horizontal synchronizing signal HD once, when the interruption mask release timing pulse signal FH 75 is inputted to one negative logic input terminal of the NOR gate 14 as shown in FIG. 10 (g), the first-stage D-flip-flop 11 is reset. By resetting the first-stage D-flip-flop 11, the output signal from its output terminal Q changes to the low level as shown in FIG. 10 (c). Then, after one pulse of the clock CLK, as shown in FIG. 10 (d), the output signal from the output terminal Q of the second-stage D-flip-flop 12 also changes to the low level, and further, after one pulse of the clock CLK therefrom, as shown in FIG. 10 (e), the output signal from the output terminal Qc of the third-stage D-flip-flop 13 changes to the high level. Since the output signal from the output terminal Q of the second-stage D-flip-flop 12, and the output signal from the output terminal Qc of the third-stage D-flip-flop 13 which are two inputs of the NAND gate 15 never become high level during this period, the horizontal synchronizing signal HD is never outputted. Thereafter, since the output signals of the D-flip-flop 11, 12 and 13 are in the states same as those shown at left-side ends of the timing charts of FIG. 10, separation of the next horizontal synchronizing signal HD is possible.

In other words, the interruption mask release timing pulse signal FH 75 given to the horizontal interruption receiving circuit 1 from the timing decoding circuit 3 has a function to release the masked signal which appears at the position of 50% of one horizontal synchronizing period fH.

Though the schedule counter circuit 2 is constituted as mentioned before by the counter circuit 21, when the horizontal synchronizing signal HD is inputted to the load terminal L, it is reset and after loading "0" as an initial value of the count value, starts to count the clock CLK which has been inputted to the input terminal T. The counter circuit 21 must count up to 910 because the composite synchronizing signal separation circuit of the present invention is applied to the NTSC system, therefore, a 10-bit configuration is employed.

The timing decoding circuit 3 inputs the count value outputs from the 10-bit output terminals Q0, Q1, ... Q9 of the counter circuit 21 of the aforementioned schedule counter circuit 2 so as to decode them, and outputs the interruption mask release timing pulse signal FH75 which becomes low level at the time point of 75% in 910 counts which are the number of pulses of the clock CLK in one fH (horizontal synchronizing period), and the vertical synchronizing sampling pulse signal VSAMP which becomes low level respectively at the time points of 25% and 75% against the fH.

Though a specific configuration of the timing decoding circuit 3 is as shown in FIG. 6, logics of the input signals of respective NAND gates 31, 32 and 33 are so set, that the first NAND gate 31 outputs the low-level signal from the negative logic output terminal at the time point where the count value corresponding to 25% of fH is outputted from the 10-bit output of the counter circuit 21, that the second NAND gate 32 outputs at the time point where the count value corresponding to 50% of fH is outputted, and that the third NAND gate 33 outputs at the time point where the count value corresponding to 75% of fH is outputted.

Since the low-level signal is outputted from the first NAND gate 31 at the time point where the count value output of the counter circuit 21 of the schedule counter circuit 2 becomes 25% of the count value corresponding to one fH, the low-level signal is given to the input terminal D of the first D-flip-flop 35 via the OR gate 34, and as shown in FIG. 9 (c), the vertical synchronizing sampling pulse signal VSAMP which is the output signal from the output terminal Q of the first D-flip-flop 35 becomes low level only during one pulse of the clock CLK at the timing of 25% of one fH.

Also, since the low-level signal is outputted from the third NAND gate 33 at the time point where the count value output of the counter circuit 21 of the schedule counter circuit 2 becomes 75% of the count value corresponding to one fH, the low-level signal is given to the input terminal D of the second D-flip-flop 36, and as shown in FIG. 9 (b), the interruption mask release timing pulse signal FH 75 which is the output signal from the output terminal Q of the second D-flip-flop 36 becomes low level only during one pulse of the clock CLK at the timing of 75% of one fH. Simultaneously, since the output signal of the third NAND gate 33 is given to the input terminal D of the first D-flip-flop 35 via the OR gate 34, as shown in FIG. 9 (c), the vertical synchronizing sampling pulse signal VSAMP which is the output signal of the first D-flip-flop 35 also becomes low level only during one pulse of the clock CLK at the timing of 75% of one fH.

Now, the J-K flip-flop 37 is provided for generating the half H signal HALF which is to be given to the field discriminating circuit 5. That is, at the time point where the horizontal synchronizing signal HD is generated from the horizontal interruption receiving circuit 1, the low-level signal is inputted to the negative logic input terminal J of the J-K flip-flop 37, and the high-level signal is inputted to the input terminal K from the second NAND gate 32. And hence, the half H signal HALF which is the output signal from the output terminal Q of the J-K flip-flop 37 changes to the high level as shown in FIGS. 11 (b) and (bb). Then, since the output signal from the NAND gate 32 changes to the low level at the time point of 50% of one fH, as shown in FIGS. 11(b) and (bb), the output signal from the output terminal Q of the J-K flip-flop 37 changes to the low level. This output signal from the output terminal Q of the J-K flip-flop 37 is given to the field discriminating circuit 5 as the half H signal HALF.

Though the vertical interruption receiving circuit 4 is constituted by the D-flip-flop 41 as mentioned before, the composite synchronizing signal SYNC is inputted to the input terminal D, the vertical synchronizing sampling pulse signal VSAMP which is the output signal of the first D-flip-flop 35 of the timing decoding circuit 3 to the input terminal T, and the reset signal RST to the reset terminal R.

Since the D-flip-flop 41 takes in the composite synchronizing signal SYNC inputted to the input terminal D at the timing of the vertical synchronizing sampling pulse signal VSAMP inputted to the input terminal T, as shown in FIG. 9 (d), the output signal from its output terminal Q becomes the vertical synchronizing signal VD.

Though the field discriminating circuit 5 is constituted by the D-flip-flop 51 as mentioned before, the half H signal HALF which is the output signal of the J-K flip-flop 37 of the timing decoding circuit 3 is inputted to the input terminal D, the vertical synchronizing signal VD which is the output signal of the aforementioned vertical interruption receiving circuit 4 to the input terminal T, and the reset signal RST to the reset terminal R. Since the D-flip-flop 51 takes in the half H signal HALF inputted to the input terminal D as shown in FIGS. 11 (b) and (bb), at the timing of the vertical synchronizing signal VD inputted to the input terminal T as shown in FIG. 11 (c) and (c), the output signal from the output terminal Q becomes the field discriminating signal FSEL which outputs the high-level signal in an odd field and the low-level signal in an even field, as shown in FIGS. 11 (d) and (dd).

As described particularly heretofore, according to the composite synchronizing signal separation circuit of the present invention, since the circuit configuration is digitized, the time constant or the like is not needed to be adjusted, and the composite synchronizing signal separation circuit which is hardly affected by ambient temperature can be obtained.

According to the composite synchronizing signal separation circuit of the present invention, since an interruption masking function is added to the horizontal interruption receiving circuit, signals of 50% fH included before and after a vertical flyback time of the composite synchronizing signal can be eliminated to separate the horizontal synchronizing signal.

Furthermore, according to the composite synchronizing signal separation circuit of the present invention, since the vertical synchronizing signal is separated by the signal managed by the horizontal synchronizing signal, a phase difference between the horizontal synchronizing signal and the vertical synchronizing signal is stabilized.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalence of such meets and bounds thereof are therefore intended to be embraced by the claims.

What is claimed is:

1. A composite synchronizing signal separation circuit which separates, from a composite synchronizing signal composed of a horizontal synchronizing signal and a vertical synchronizing signal, said two synchronizing signals respectively, comprising:

a horizontal synchronizing signal separation circuit which, when detecting significant level changes of the composite synchronizing signal in a reset state, outputs said significant level changes as the horizontal synchronizing signal, and fixes the state of output signal;

a counter circuit which is reset by the horizontal synchronizing signal outputted by said horizontal synchronizing signal separation circuit, and outputs count value while counting up to a predetermined value in one horizontal synchronizing period;

a decoding circuit which decodes the count value outputted by said counter circuit, and respectively outputs first, second and third timing signals at the time points of $\frac{1}{4}$, $\frac{1}{2}$ and $\frac{3}{4}$ from the starting time point of one horizontal synchronizing period; and a vertical synchronizing signal separation circuit which outputs the vertical synchronizing signal by inverting its own output signal level, when the composite synchronizing signal level at the time moment corresponding to said first and third output timings differs from the composite synchronizing signal level at the previous time moment corresponding to the first and third timing signals;

wherein said horizontal synchronizing signal separation circuit is reset by the third timing signal.

2. A composite synchronizing signal separation circuit as set forth in claim 1,
   wherein said composite synchronizing signal is the NTSC system, and said counter circuit is constituted by 10 bits so as to count, at least, up to 910.

3. A composite synchronizing signal separation circuit which separates, from a composite synchronizing signal composed of a horizontal synchronizing signal and a vertical synchronizing signal, said two synchronizing signals respectively, comprising:

a horizontal synchronizing signal separation circuit which, when detecting significant level changes of the composite synchronizing signal in a reset state, outputs said significant level changes as the horizontal synchronizing signal, and fixes the state of output signal;

a counter circuit which is reset by the horizontal synchronizing signal outputted by said horizontal synchronizing signal separation circuit, and outputs count value while counting up to a predetermined value in one horizontal synchronizing period;

a decoding circuit which decodes the count value outputted by said counter circuit, and respectively outputs first, second and third timing signals at the time points of $\frac{1}{4}$, $\frac{1}{2}$ and $\frac{3}{4}$ from the starting time point of one horizontal synchronizing period;

a vertical synchronizing signal separation circuit which outputs the vertical synchronizing signal by inverting its own output signal level, when the composite synchronizing signal level at the time moment corresponding to said first and third output timings differs from the composite synchronizing signal level at the previous time moment corresponding to the first and third timing signals; and;

a field discriminating circuit which outputs a field discriminating signal by inverting its own output signal level, when the second timing signal level differs from the last output timing of the vertical synchronization signal, in the output timings of the vertical synchronizing signal from said vertical synchronizing signal separation circuit;

wherein said horizontal synchronizing signal separation circuit is reset by the third timing signal.

4. A composite synchronizing signal separation circuit as set forth claim 3,
   wherein said composite synchronizing signal is the NTSC system and said counter circuit is constituted by 10 bits so as to count, at least, up to 910.

* * * * *